(12) United States Patent
Kapolnek et al.

(10) Patent No.: US 11,142,109 B2
(45) Date of Patent: Oct. 12, 2021

(54) AUDIO SYSTEM FOR A VEHICLE

(71) Applicant: GM Global Technology Operations LLC, Detroit, MI (US)

(72) Inventors: Gerard Kapolnek, Carleton, MI (US); Chad C. Cairns, Oakland Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 116 days.

(21) Appl. No.: 16/376,629

(22) Filed: Apr. 5, 2019

(65) Prior Publication Data

US 2020/0317103 A1 Oct. 8, 2020

(51) Int. Cl.
| | |
|---|---|
| *B60N 2/879* | (2018.01) |
| *B60R 11/02* | (2006.01) |
| *B60N 2/90* | (2018.01) |
| *B60R 11/00* | (2006.01) |
| *B60N 2/66* | (2006.01) |

(52) U.S. Cl.
CPC ............. *B60N 2/879* (2018.02); *B60N 2/90* (2018.02); *B60R 11/0217* (2013.01); *B60N 2/66* (2013.01); *B60R 2011/0015* (2013.01)

(58) Field of Classification Search
CPC ........ B60N 2/879; B60N 2/90; B60R 11/0217
See application file for complete search history.

(56) References Cited

U.S. PATENT DOCUMENTS

| | | | |
|---|---|---|---|
| 6,616,235 B1* | 9/2003 | Khavari | B60N 2/847 |
| | | | 297/408 X |
| 6,991,289 B2* | 1/2006 | House | B60R 11/0217 |
| | | | 297/217.4 |
| 2017/0214988 A1* | 7/2017 | Ferretti | B60N 2/829 |
| 2019/0001853 A1* | 1/2019 | Durkee | B60N 2/879 |
| 2019/0014415 A1* | 1/2019 | White, III | H04R 5/023 |

\* cited by examiner

*Primary Examiner* — Anthony D Barfield

(57) ABSTRACT

A passenger seat assembly for a vehicle includes a seat back having a center portion disposed on the upper part of the seat back. The center portion of the seat back includes a receptacle and an audio system selectively disposed in the receptacle and the receptacle includes a retention feature and a battery charge unit.

15 Claims, 4 Drawing Sheets

AUDIO SYSTEM FOR A VEHICLE

INTRODUCTION

The present disclosure relates generally to an audio sound system for a vehicle and more particularly to portable or multipurpose audio or sound systems for a vehicle.

Passenger seats for vehicles have increased in complexity. Conventional, passenger seats are adjustable, both mechanically and electro-mechanically, allowing for the occupant to achieve the optimal sitting or operating position. Additionally, passenger seats provide heating and cooling to the seat surface. Some passenger seats also include weight sensors to determine if an occupant is present in the seat. Moreover, it is not uncommon for some passenger seats to have speakers mounted in the head rest and communicate with the audio system of the vehicle.

While passenger seats achieve their intended purpose, there is a need in the art for improved passenger seats for vehicles having multiple functions including connectivity to infotainment and personal electronics. Improvements in passenger comfort, convenience, and experience will result from the improved passenger seat.

SUMMARY

A passenger seat assembly for a vehicle is provided including a seat back having a lumbar support, a first side bolster, a second side bolster, a first shoulder bolster, a second shoulder bolster, and a center portion, and wherein the center portion of the seat back includes a receptacle.

In one example of the present disclosure, the receptacle of the center portion of the seat back includes a retention feature.

In another example of the present disclosure, the receptacle of the center portion of the seat back further includes a battery charge unit.

In yet another example of the present disclosure, the battery charge unit of the receptacle is a wireless battery charge unit.

In yet another example of the present disclosure, the battery charge unit of the receptacle has a pair of electrical contacts.

In yet another example of the present disclosure, the passenger seat assembly further comprises an audio system selectively disposed in the receptacle of the center portion of the seat back.

In yet another example of the present disclosure, the audio system includes a housing, a battery, a first speaker, and a second speaker and the battery, the first speaker, and the second speaker are disposed in the housing.

In yet another example of the present disclosure, the housing of the audio system has a center housing portion having a first end and a second end, a first extension portion having a third end and a fourth end, and a second extension portion having a fifth end and a sixth end.

In yet another example of the present disclosure, the second end of the first extension portion of the housing is fixed to the first end of the center housing portion and the fourth end of the second extension portion of the housing is fixed to the second end of the center housing portion.

In yet another example of the present disclosure, the first extension portion of the housing and the center housing portion form a first angle between 90° and 120° and the second extension portion of the housing and the center housing portion form a second angle between 90° and 120°.

In yet another example of the present disclosure, the retention feature of the receptacle includes a pivoting lever and a spring.

In yet another example of the present disclosure, the retention feature of the receptacle includes a magnet.

In yet another example of the present disclosure, the audio system further includes a wireless data connectivity driver and an amplifier.

In yet another example of the present disclosure, the receptacle includes a first channel, a second channel, and a center channel, the first channel has a first channel end disposed adjacent to a second channel end of the center channel, and the second channel has a third channel end disposed adjacent to a fourth end of the center channel.

In yet another example of the present disclosure, the first channel of the receptacle and the center channel of the receptacle form a third angle between 90° and 120° and the second channel of the receptacle and the center channel of the receptacle form a fourth angle between 90° and 120°.

A passenger seat assembly for a vehicle is provided including a seat back having a center portion. The center portion of the seat back includes a receptacle and an audio system selectively disposed in the receptacle and the receptacle includes a retention feature and a battery charge unit.

In one example of the present disclosure, the battery charge unit of the receptacle is one of a wireless battery charge unit and a pair of electrical contacts and the retention feature of the receptacle includes one of a pivoting lever and a spring and a magnet.

In another example of the present disclosure, the audio system includes a housing, a battery, a first speaker, and a second speaker and the battery, the first speaker, and the second speaker are disposed in the housing. The housing of the audio system includes a center housing portion having a first end and a second end, a first extension portion having a third end and a fourth end, and a second extension portion having a fifth end and a sixth end.

In yet another example of the present disclosure, the receptacle includes a first channel, a second channel, and a center channel, the first channel has a first channel end disposed adjacent to a second channel end of the center channel forming a first angle between 90° and 120°, and the second channel has a third channel end disposed adjacent to a fourth end of the center channel forming a second angle between 90° and 120°.

A passenger seat assembly for a vehicle is provided including a seat back having a center portion. The seat back is connected to a seat base of the passenger seat assembly. The center portion of the seat back is disposed in an upper portion of the seat back. The center portion of the seat back includes a receptacle and an audio system selectively disposed in the receptacle. The receptacle has a retention feature and a battery charge unit. The battery charge unit of the receptacle is one of a wireless battery charge unit and a pair of electrical contacts. The retention feature of the receptacle includes at least one of a pivoting lever, a spring, and a magnet, the audio system includes a housing, a battery, a first speaker, and a second speaker and the battery. The first speaker and the second speaker are disposed in the housing. The housing of the audio system has a center housing portion having a first end and a second end. A first extension portion having a third end and a fourth end. A second extension portion having a fifth end and a sixth end. The receptacle comprises a first channel, a second channel, and a center channel. The first channel has a first channel end disposed adjacent to a second channel end of the center channel forming a first angle between 90° and 120°. The second channel has a third channel end disposed adjacent to a fourth end of the center channel forming a second angle between 90° and 120°.

The above features and advantages and other features and advantages of the present disclosure are readily apparent from the following detailed description when taken in connection with the accompanying drawings.

BRIEF DESCRIPTION OF THE DRAWING

The drawings described herein are for illustration purposes only and are not intended to limit the scope of the present disclosure in any way.

DESCRIPTION

Figure 1:
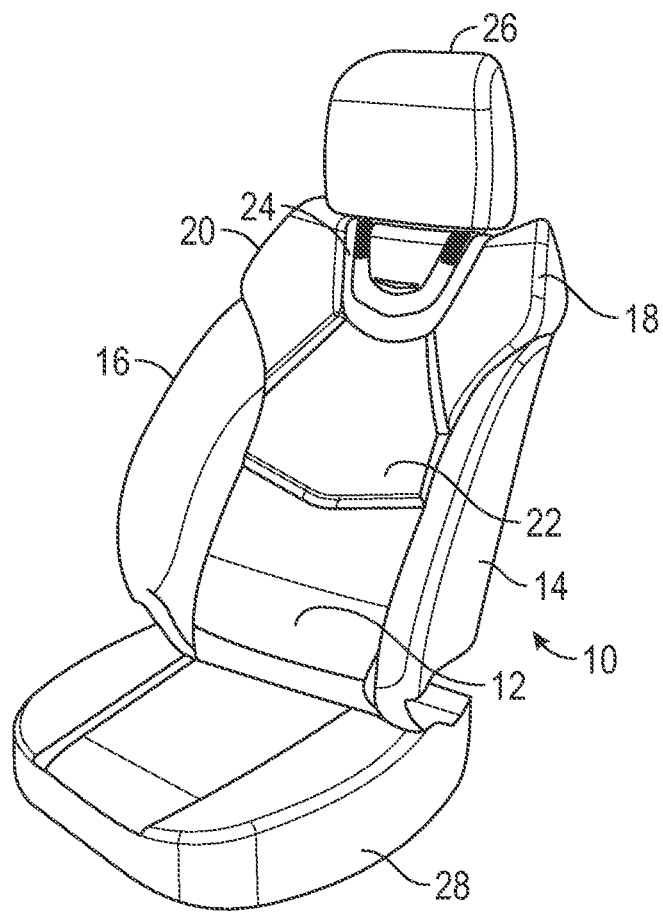
FIG. 1 is a perspective view of a passenger seat of a vehicle according to the principles of the present disclosure.
Figure 2:
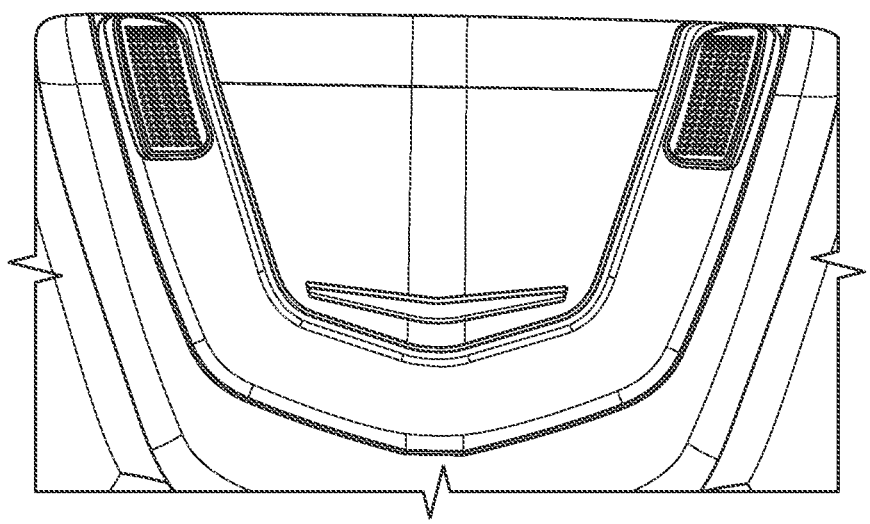
FIG. 2 is a view of a portion of a seat back of a passenger seat of a vehicle according to the principles of the present disclosure.

The following description is merely exemplary in nature and is not intended to limit the present disclosure, application, or uses.

Examples of the present disclosure advantageously provide a passenger seat assembly including an audio system integrated into the seat back of the passenger seat assembly. As illustrated in FIGS. 1-8, the seat back 10 is an assembly of a frame, cushions, and upholstery that includes a lumbar support 12, a first side bolster 14, a second side bolster 16, a first shoulder bolster 18, a second shoulder bolster 20, a back portion 22, a center portion 24, and a head rest 26. The seat back 10 is attached to a seat bottom 29 via the frame and is capable of movement relative to the seat bottom 29 providing for the maximum comfort and ideal driving or sitting position of the occupant. The lumbar support 12 is the bottom portion of the seat back 10 and provides a buttress for the lower back region of the passenger or occupant. The first and second side bolsters 14, 16 extend from the sides of the lumbar support 12 and protrude around the sides of the occupant. Therefore, the first and second side bolsters 14, 16 tend to keep the occupant from drifting side-to-side in the seat back when the vehicle is performing maneuvers causing side loads on the occupant.

In supporting the occupant's shoulders, the first and second shoulder bolsters 18, 20 are disposed above the first and second side bolsters 14, 16, respectively. The back portion 22 is disposed between the first and second side bolsters 14, 16 and providing additional support to the occupant. The center portion 24 of the seat back 10 is disposed above the back portion 22 and between the first and second shoulder bolsters 18, 20. The center portion 24 includes a receptacle 28 for temporarily housing an audio system 30.

Figure 3:
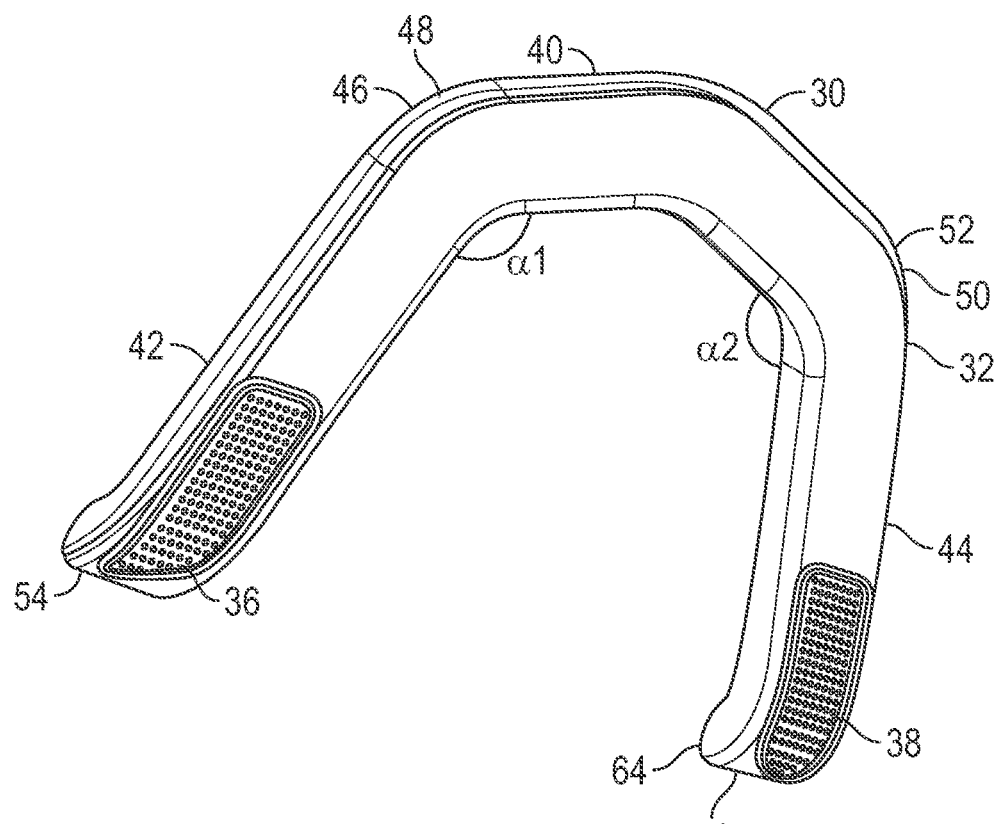
FIG. 3 is a perspective view of an audio system according to the principles of the present disclosure.
Figure 4:
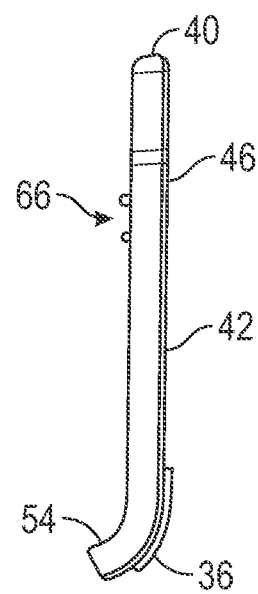
FIG. 4 is a side view of an audio system according to the principles of the present disclosure.
Figure 5:
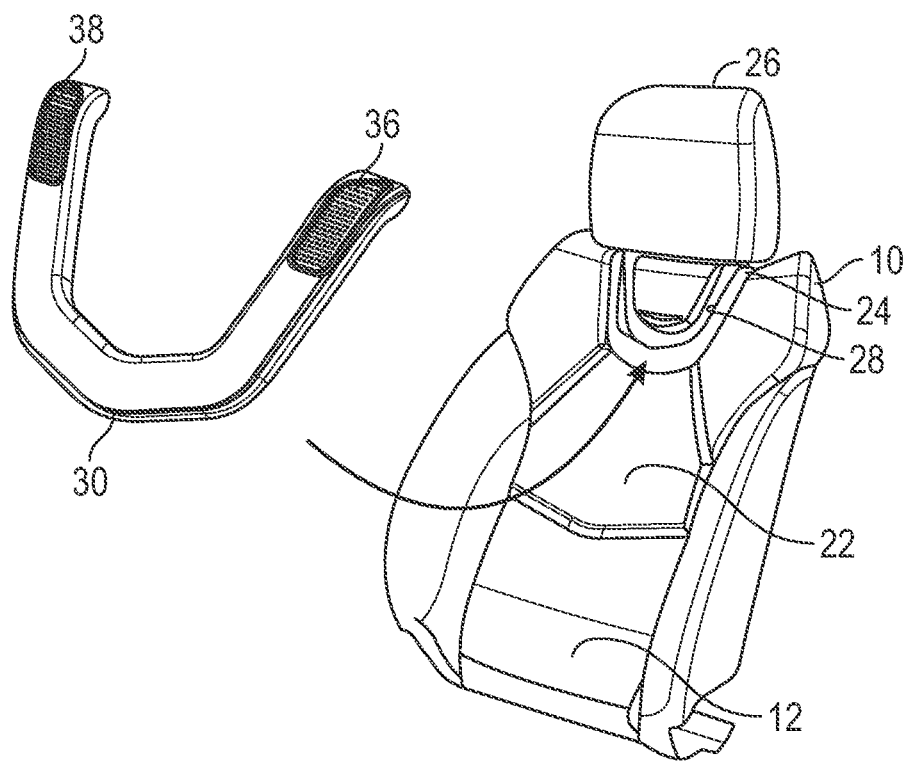
FIG. 5 is a perspective view of an audio system and a seat back of a passenger seat of a vehicle according to the principles of the present disclosure.
Figure 6:
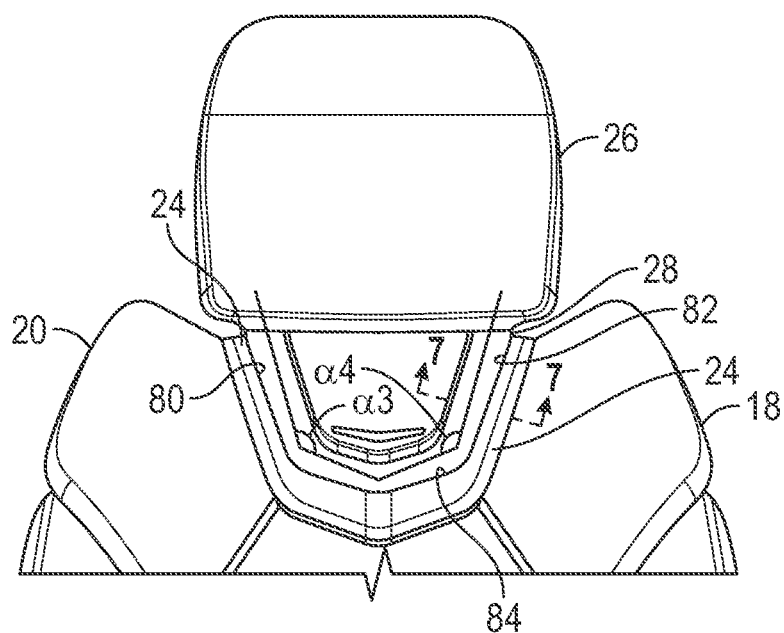
FIG. 6 is a plan view of a upper seat back of a passenger seat of a vehicle according to the principles of the present disclosure.
Figure 7:
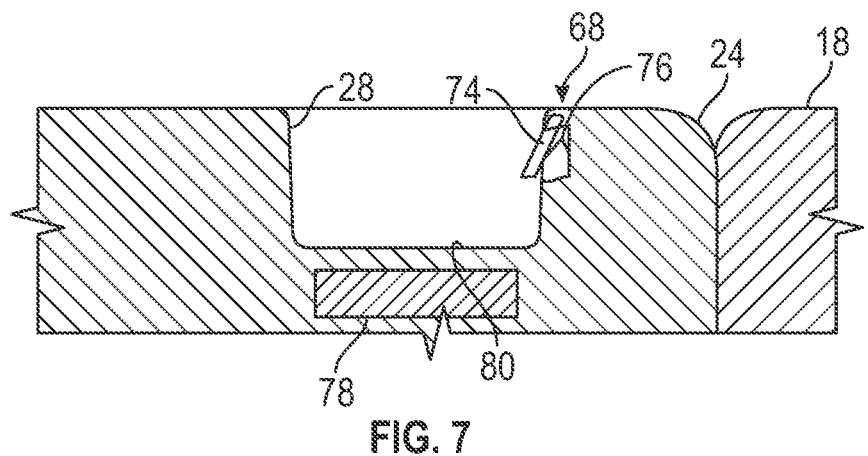
FIG. 7 is a cross section of a center portion of a seat back of a passenger seat according to the principles of the present disclosure.
Figure 8:
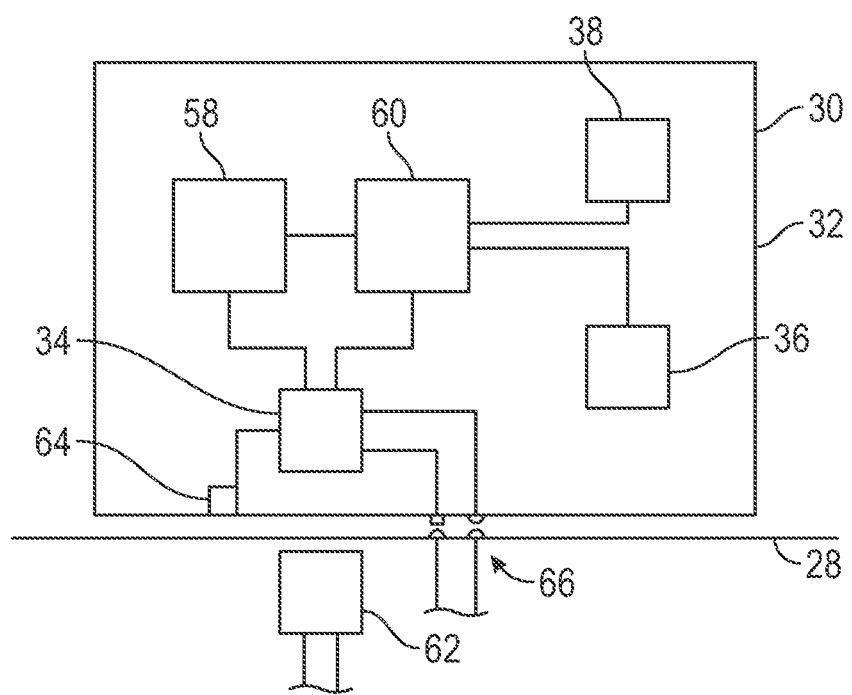
FIG. 8 is a schematic diagram of a center portion of a seat back and audio system according to the principles of the present disclosure.

Referring now to FIGS. 3, 4, and 8, the audio system 30 is illustrated and will now be described in detail. The audio system 30 has a housing 32, a battery 34, a wireless data connectivity driver 58, an amplifier 60, a first speaker 36, and a second speaker 38. The housing 32 of the audio system 30 includes a center housing portion 40, a first extension portion 42, and a second extension portion 44. The first extension portion 42 has a first end 46 disposed on a first end 48 of the center housing portion 40. The second extension portion 44 has a first end 50 disposed on a second end 52 of the center housing portion 40. The first speaker 36 is disposed in the housing 32 proximate a second end 54 of the first extension portion 42. The second speaker 38 is disposed in the housing 32 proximate a second end 56 of the second extension portion 44. The first extension portion 42 of the housing 32 and the center housing portion 40 of the housing 32 form a first angle $\alpha_1$ between 90° and 120° and the second extension portion 44 of the housing 30 and the center housing portion 40 of the housing 30 form a second angle $\alpha_2$ between 90° and 120°.

The battery 34, wireless data connectivity driver 58, and amplifier 60 are disposed within the housing 32. The wireless data connectivity driver 58 may be a Bluetooth wireless data connectivity device. Still, other types of wireless data connectivity may be incorporated without departing from the scope of the invention. For example, the wireless data connectivity driver 58 may enable a Wi-Fi connection. The battery 34 is a rechargeable battery that may be charged using one or more of a wireless battery charger 62, a wired battery charger 64, and a battery charger using charging contacts 66 that electronically connect when the audio system 30 is docked in the receptacle 28. The amplifier 60 provides signal amplification between the wireless data connectivity driver 58 and the speakers 36, 38. Connected with the wireless data connectivity driver 58 and the amplifier 60, the battery 34 provides power to the audio system 30 for hours of untethered listening entertainment or communication. In the instance of suing the audio system for communication, the audio system may also include a microphone (not shown).

The receptacle 28 of the center portion 24 of the seat back 10 is formed by a first channel 80, a second channel 82, and a center channel 84. The first channel has 80 a first end 86 disposed adjacent to a first end 88 of the center channel 84. The second channel 82 has a first end 90 disposed adjacent to a second end 92 of the center channel 84. Furthermore, the first channel 80 of the receptacle 28 and the center channel 84 of the receptacle 28 form a third angle $\alpha_3$ between 90° and 120°. Likewise, the second channel 82 of the receptacle 28 and the center channel 84 of the receptacle 28 form a fourth angle $\alpha_4$ between 90° and 120°. The shape and size of the receptacle 28 mimics or mirrors the shape and size of the audio system 30 such that when the audio system 30 is disposed in the receptacle 28, the center portion 24 of the seat back 10 appears as a seamless combination of the audio system 30 and the receptacle 28.

The receptacle 28 further includes a retention feature 68 and a battery charge unit 70. More specifically, the retention feature 68 of the receptacle may be a positive and movable selectively locking mechanism 72 that coordinates with a feature of the housing 32 of the audio system 30. For example, the retention feature 68 may include a pivoting lever 74 urged to a locked position by a spring 76. Alternatively, the retention feature 68 may be a magnet 78 disposed in the center portion 24 of the seat back 10 proximate to the surface of one of the first, second, or center channels 80, 82, 84.

The battery charge unit 70 of the receptacle 28 of the center portion of the seat back may be a wireless battery charger 62. Alternatively, the battery charge unit 70 may include a pair of charging contacts 66 for providing the battery 34 of the audio system 30 with power.

The removable audio system 30 is connectable to the vehicles audio system as well as can be paired with any portable electronic device. At the same time, it can be used in the vehicle to enhance the personal experience by tailoring the audio settings to the occupant of the seat.

While examples have been described in detail, those familiar with the art to which this disclosure relates will recognize various alternative designs and examples for practicing the disclosed structure within the scope of the appended claims.

The following is claimed:

1. A passenger seat assembly for a vehicle, the passenger seat assembly comprising:
    a seat back having a lumbar support, a first side bolster, a second side bolster, a first shoulder bolster, a second shoulder bolster, and a center portion, and wherein the center portion of the seat back includes a receptacle, wherein the receptacle includes a retention feature comprising a magnet or a pivoting lever and a spring; and
    an audio system releasably disposed in the receptacle.

2. The passenger seat assembly of claim 1 wherein the receptacle of the center portion of the seat back further includes a battery charge unit.

3. The passenger seat assembly of claim 2 wherein the battery charge unit of the receptacle is a wireless battery charge unit.

4. The passenger seat assembly of claim 2 wherein the battery charge unit of the receptacle has a pair of electrical contacts.

5. The passenger seat assembly of claim 1 wherein the audio system includes a housing, a battery, a first speaker, and a second speaker and the battery, the first speaker, and the second speaker are disposed in the housing.

6. The passenger seat assembly of claim 5 wherein the housing of the audio system has a center housing portion having a first end and a second end, a first extension portion having a third end and a fourth end, and a second extension portion having a fifth end and a sixth end.

7. The passenger seat assembly of claim 6 wherein the second end of the first extension portion of the housing is fixed to the first end of the center housing portion and the fourth end of the second extension portion of the housing is fixed to the second end of the center housing portion.

8. The passenger seat assembly of claim 7 wherein the first extension portion of the housing and the center housing portion form a first angle between 90° and 120° and the second extension portion of the housing and the center housing portion form a second angle between 90° and 120°.

9. The passenger seat assembly of claim 5 wherein the audio system further includes a wireless data connectivity driver and an amplifier.

10. The passenger seat assembly of claim 1 wherein the first channel of the receptacle and the center channel of the receptacle form a third angle between 90° and 120° and the second channel of the receptacle and the center channel of the receptacle form a fourth angle between 90° and 120°.

11. A passenger seat assembly for a vehicle, the passenger seat assembly comprising a seat back including a center portion, and wherein the center portion of the seat back includes a receptacle and an audio system selectively disposed in the receptacle and the receptacle includes a retention feature and a battery charge unit, and wherein the battery charge unit of the receptacle is a wireless battery charge unit.

12. The passenger seat assembly of claim 11 wherein the retention feature of the receptacle includes one of a pivoting lever and a spring and a magnet.

13. The passenger seat assembly of claim 12 wherein the audio system includes a housing, a battery, a first speaker, and a second speaker and the battery, the first speaker, and the second speaker are disposed in the housing, the housing of the audio system includes a center housing portion having a first end and a second end, a first extension portion having a third end and a fourth end, and a second extension portion having a fifth end and a sixth end.

14. The passenger seat assembly of claim 13 wherein the receptacle includes a first channel, a second channel, and a center channel, the first channel has a first channel end disposed adjacent to a second channel end of the center channel forming a first angle between 90° and 120°, and the second channel has a third channel end disposed adjacent to a fourth channel end of the center channel forming a second angle between 90° and 120°.

15. A passenger seat assembly for a vehicle, the passenger seat assembly comprising:
    a seat back connected to a seat base of the passenger seat assembly, and
    a center portion of the seat back disposed in an upper portion of the seat back, and wherein the center portion of the seat back includes a receptacle and an audio system selectively disposed in the receptacle, the receptacle having a retention feature and a battery charge unit; and
    wherein the battery charge unit of the receptacle is one of a wireless battery charge unit and a pair of electrical contacts, the retention feature of the receptacle includes at least one of a pivoting lever, a spring, and a magnet, the audio system includes a housing, a battery, a first speaker, and a second speaker and the battery, the first speaker, and the second speaker are disposed in the housing, the housing of the audio system has a center housing portion having a first end and a second end, a first extension portion having a third end and a fourth end, and a second extension portion having a fifth end and a sixth end, and the receptacle comprises a first channel, a second channel, and a center channel, the first channel has a first channel end disposed adjacent to a second channel end of the center channel forming a first angle between 90° and 120°, and the second channel has a third channel end disposed adjacent to a fourth channel end of the center channel forming a second angle between 90° and 120°.

* * * * *